No. 723,618. PATENTED MAR. 24, 1903.
A. S. NEWTON.
GREASE TRAP.
APPLICATION FILED NOV. 14, 1901.

NO MODEL.

WITNESSES:
Chas. H. Luther Jr
Ada E. Hagerty.

INVENTOR:
Albert S. Newton
Joseph A. Miller & Co.
ATTORNEYS.

UNITED STATES PATENT OFFICE.

ALBERT S. NEWTON, OF PROVIDENCE, RHODE ISLAND.

GREASE-TRAP.

SPECIFICATION forming part of Letters Patent No. 723,618, dated March 24, 1903.

Application filed November 14, 1901. Serial No. 82,241. (No model.)

*To all whom it may concern:*

Be it known that I, ALBERT S. NEWTON, a citizen of the United States, residing at Providence, in the county of Providence and State of Rhode Island, have invented a new and useful Improvement in Grease-Traps, of which the following is a specification.

This invention has reference to an improvement in the class of waste-traps designed to retain grease or fatty matter to prevent the discharge of such matter into the conduit, pipes, or sewer.

The object is to facilitate the separation of the fatty matter from the water, the retention of the grease, and the cleaning of the trap.

To this end the invention consists in the peculiar and novel construction whereby the flow of the water through the trap is facilitated and the fatty matter collected, as will be more fully set forth hereinafter.

In hotels, restaurants, and other places where dish and other waste water containing grease is discharged the fatty matter combines with other impurities and may close the discharge pipes or ducts. When the water containing the fatty matter is agitated and then allowed to stand while it cools, the water will separate from the grease and may be discharged practically free from fatty matter. I have designed a grease-trap provided with chambers constructed to facilitate the collection of the grease, the discharge of the water, and the removal of the grease.

Figure 1:
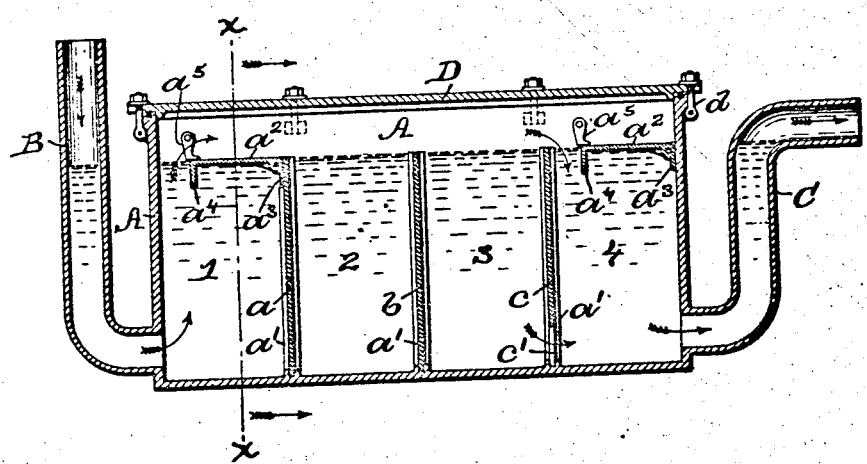
Figure 2:
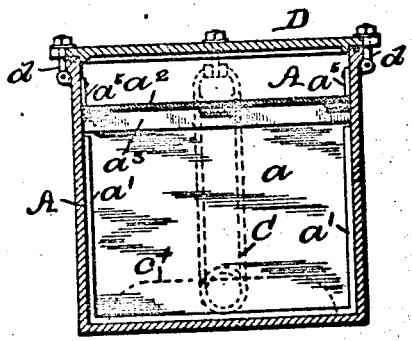
Figure 3:
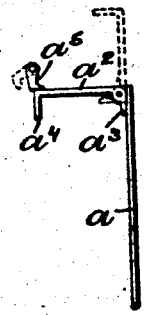

Figure 1 is a longitudinal sectional view of my improved grease-trap. Fig. 2 is a transverse section on the line X X of Fig. 1. Fig. 3 is an end view of one of the partitions by which the body of the trap is divided into a series of chambers. A baffle-plate is shown pivotally connected with the partition and indicated in broken lines in the raised position.

In the drawings, A indicates the tank, forming the main body of the grease-trap, B the inlet-pipe, and C the outlet-pipe. The cross-sectional areas of the inlet and outlet pipes are only a fraction of the cross-sectional area of the tank A—as shown in the drawings about as one to sixty. The tank is provided with the removable cover D. The partitions $a$, $b$, and $c$ divide the tank A into the chambers 1, 2, 3, and 4. The partitions may be fixed in the tank when the baffle-plates are pivotally secured, so that they may be lifted to give access to the chambers for cleaning. In the preferred form the partitions are inserted into grooves formed by the ways $a'$ $a'$, so that they may be drawn out and the whole of the interior of the tank be accessible for cleaning. The baffle-plate $a^2$ has the downward-extending lip $a^4$, acting as a skimmer to retard the outflow of the grease collected under the baffle-plate. A stop-plate $a^3$ on the opposite edge of the baffle-plate bears on the partition below the hinge to support the baffle-plate, and the pawl $a^5$ locks the same in the operative position. The partition $c$ is provided with the opening $c'$ at its lower end to permit the outflow of the waste water from the lower part of the chamber toward the outlet-pipe, as shown in Fig. 1 and indicated in broken lines in Fig. 2. The cover D is fastened to the top of the tank A by the hinged bolts $d$ $d$.

I will now describe the operation of my improved grease-trap. The waste water, usually heated, is discharged through the inlet-pipe B into the chamber 1 of the tank A near the bottom. Owing to the large area of this chamber the flow of the waste water is slow. The water cools, and the fatty matter separates and flows upward and is in part retained by the baffle-plate $a^2$. The waste passes from the contracted outlet of the chamber 1 into the chambers 2 and 3, where the cooling and separation continue, so that the waste water is practically free from grease and may flow through the opening $c'$ into the chamber 4 and directly through the same out of the outlet-pipe C. As the chamber 4 is provided with a baffle-plate $a^2$, the now cooled and caked grease is prevented from entering the chamber 4.

It is evident that should the opening $c'$ become clogged or filled up then the waste water will flow over the partition $c$ and into the chamber 4, and should there still be any grease or fatty matter carried with it the grease will rise and be held by the baffle-plate $a^2$ of the chamber 4. The baffle-plates tend to collect the grease or other fatty matter in a solid mass, thereby preventing the same from being carried along by a sudden flow of the waste water through the trap.

Having thus described my invention, I claim as new and desire to secure by Letters Patent—

1. In a grease-trap, the combination with the trap-body, the inlet and outlet pipes, and the removable cover, of removable partitions dividing the trap-body into chambers, ways in the sides of the trap-body for the partitions, hinged deflector-plates extending across parts of the chambers, downward-extending lips on the deflector-plates, and pivoted pawls for locking the deflector-plates in operative position, as described.

2. In a grease-trap, in combination with the tank A, the inlet-pipe B, the outlet-pipe C, the cover D, the removable partition $a$, with the baffle-plate $a^2$ hinged to the partition, having the lip $a^4$ and the stop-plate $a^3$, the pawl $a^5$, the partition $b$ and the partition $c$ having the opening $c'$ all arranged so as to retard the flow and separate the grease from the water, as described.

In testimony whereof I have signed my name to this specification in the presence of two subscribing witnesses.

ALBERT S. NEWTON.

Witnesses:
ADA E. HAGERTY,
J. A. MILLER, Jr.